(12) United States Patent
Beymore et al.

(10) Patent No.: US 8,692,991 B2
(45) Date of Patent: Apr. 8, 2014

(54) OPTIMAL TINT IDENTIFIER/SELECTOR

(75) Inventors: Paul Michael Beymore, Vermilion, OH (US); Jon David Whitby, Kilsyth South (AU)

(73) Assignee: PPG Industries Ohio, Inc., Cleveland, OH (US)

( * ) Notice: Subject to any disclaimer, the term of this patent is extended or adjusted under 35 U.S.C. 154(b) by 20 days.

(21) Appl. No.: 13/365,732

(22) Filed: Feb. 3, 2012

(65) Prior Publication Data

US 2013/0201476 A1    Aug. 8, 2013

(51) Int. Cl.
G01J 3/42       (2006.01)
G01N 31/00     (2006.01)
G01N 37/00     (2006.01)

(52) U.S. Cl.
USPC .............................. 356/319; 702/23; 702/82

(58) Field of Classification Search
USPC ............ 356/402, 405, 407, 408, 319; 702/22, 702/23, 81–84
See application file for complete search history.

(56) References Cited

U.S. PATENT DOCUMENTS

| | | | |
|---|---|---|---|
| 3,368,864 A | 2/1968 | Ulrich | |
| 3,601,589 A * | 8/1971 | McCarty | 382/165 |
| 4,500,919 A | 2/1985 | Schreiber | |
| 4,813,000 A | 3/1989 | Wyman et al. | |
| 5,023,814 A | 6/1991 | Guillemin | |
| 5,720,017 A * | 2/1998 | Cheetam et al. | 345/595 |
| 5,740,078 A | 4/1998 | Cheetam et al. | |
| 5,907,495 A | 5/1999 | Snyder et al. | |
| 7,069,198 B2 | 6/2006 | Snyder et al. | |
| 7,145,656 B2 * | 12/2006 | Rodrigues et al. | 356/402 |
| 7,466,415 B2 * | 12/2008 | Gibson et al. | 356/402 |
| 7,536,231 B2 | 5/2009 | McClanahan et al. | |
| 7,827,163 B2 | 11/2010 | Masuda et al. | |
| 2003/0125911 A1 | 7/2003 | Snyder et al. | |
| 2005/0128484 A1 | 6/2005 | Rodrigues et al. | |
| 2011/0058173 A1 | 3/2011 | Bornemann et al. | |

FOREIGN PATENT DOCUMENTS

| | | |
|---|---|---|
| WO | 2006/052556 A2 | 5/2006 |
| WO | 2009/127356 A1 | 10/2009 |

* cited by examiner

*Primary Examiner* — Kara E. Geisel
*Assistant Examiner* — Willie Merrell, II
(74) *Attorney, Agent, or Firm* — Robert P. Lenart

(57) ABSTRACT

A method for determining a paint formulation includes: obtaining target color information for a target color, identifying a plurality of toners and corresponding concentrations of the toners in a paint formula that can be used to produce a paint having a color that is similar to the target color, and modifying the paint formula by removing one of the identified toners having a lowest concentration to produce a modified paint formula that can be used to produce a paint having a color that is similar to the target color, and determining if the modified paint formula meets user specified acceptance criteria. An apparatus that can be used to perform the method is also described.

18 Claims, 5 Drawing Sheets

US 8,692,991 B2

OPTIMAL TINT IDENTIFIER/SELECTOR

FIELD OF INVENTION

The present invention generally relates to a method and apparatus for producing coating compositions that are color matched to target coatings.

BACKGROUND OF THE INVENTION

Traditional techniques to match colors (paint, textiles, inks, etc.) utilize some form of the Kubelka-Munk theory. This theory is designed to work effectively with opaque, solid color samples. However it has been adopted for use in a variety of different samples (metallic paints for example). One issue with the application of Kubelka-Munk theory for color matching is that the mathematical solutions concluded via this theory can often be impractical. For example, in order to match a gray sample, a process using this theory can often produce a solution that mixes complementary colors. Although the solution is mathematically correct and will result in a good match to the color desired, the solution is impractical because it is much more expensive, complex, and has worse stability/reproducibility than mixing black and white toners.

Previously known paint formulation software uses a trial and error approach to selection of toners and their respective concentrations in a paint formula. This can result in hundreds or thousands of sorted formulations. A more efficient method of selecting toners and determining concentrations is desirable.

SUMMARY OF THE INVENTION

In one aspect, a method includes: obtaining target color information for a target color, identifying a plurality of toners and corresponding concentrations of the toners in a paint formula that can be used to produce a paint having a color that is similar to the target color, modifying the paint formula by removing one of the identified toners having a lowest concentration to produce a modified paint formula that can be used to produce a paint having a color that is similar to the target color, and determining if the modified paint formula meets user specified acceptance criteria.

In another aspect, an apparatus includes a device for capturing information for a target color; a processor for identifying a plurality of toners and corresponding concentrations of the toners in a paint formula that can be used to produce a paint having a color that is similar to the target color, and removing one of the identified toners having a lowest concentration to produce a modified paint formula that can be used to produce a paint having a color that is similar to the target color, and determining if the modified paint formula meets user specified acceptance criteria; and an output device for conveying the modified paint formulation to a user.

The method and apparatus outputs the single best formulation (i.e. only 1 formulation) aligned to the user defined criteria.

DETAILED DESCRIPTION OF THE INVENTION

In one aspect, a method of identifying and/or selecting toners in a paint system that can be used to produce a desired or target color is described herein. In a secondary aspect, the method provides a concentration for each toner in a single, best match solution for an unknown sample, where the solution is a formula, of toners and the unknown sample is a target paint color that can be produced using the formulation.

Figure 1:
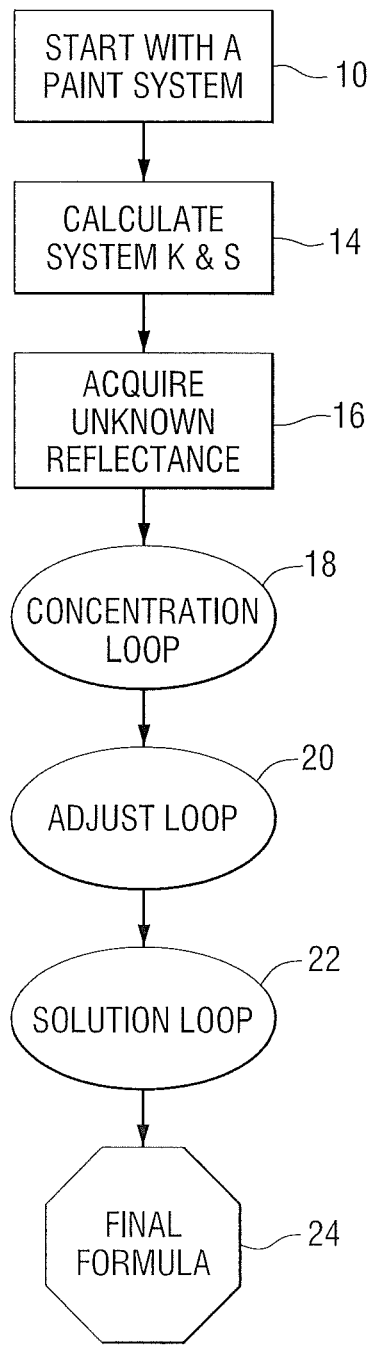
FIG. 1 is a flowchart illustrating a method used to determine a color formula.

FIG. 1 is a flowchart illustrating a method used to determine a color formula or toners that can be used to produce a target paint color. The method starts in block 10 with the selection of a paint system. The paint system can be for example, a water-borne or solvent-borne paint system. The selected paint system will include the entire array of possible toners available for a given paint system/offering that can be combined with a base to produce a desired color. As used in this description, the word "toner" encompasses tinters, pigments, dyes or other colorants.

Absorbance, k, and scattering, s, information (block 14) for each toner of the selected paint system, can be stored in a database or spreadsheet after having been determined using Kubelka-Munk or a similar equation. This information can be retrieved from the database for usage in identifying and/or selecting toners in a paint system that may be used to produce a desired or target color. Examples of such equations can be found in Roy S. Berns, "Billmeyer and Saltzman's Principles of Color Technology", 3rd edition, John Wiley, New York, 2000, which is hereby incorporated by reference.

Block 16 shows the acquisition of information relating to the color to be matched. The color to be matched is referred to as the desired color or the target color. The target color information may include reflectance or textural data or other colorimetric information (for example: L, a, b, C, h, etc.) that can be obtained using, for example, a spectrophotometer or a spectrophotometer/camera combination.

Then the k and s values for each toner in the selected paint system and reflectance data for the target color are used in a toner selection process including a concentration loop 18, an adjust loop 20, and a solution loop 22. The selection process outputs a final formula as shown in block 24. The final formula can include a list of toners and concentrations or quantities of the toners. As used in this description, formula and formulation both refer to a list of toners.

The toner selection process starts by assuming that all toners of a paint system constitute an initial group of toners that might possibly be included in the paint formula that matches the target color.

Figure 2:
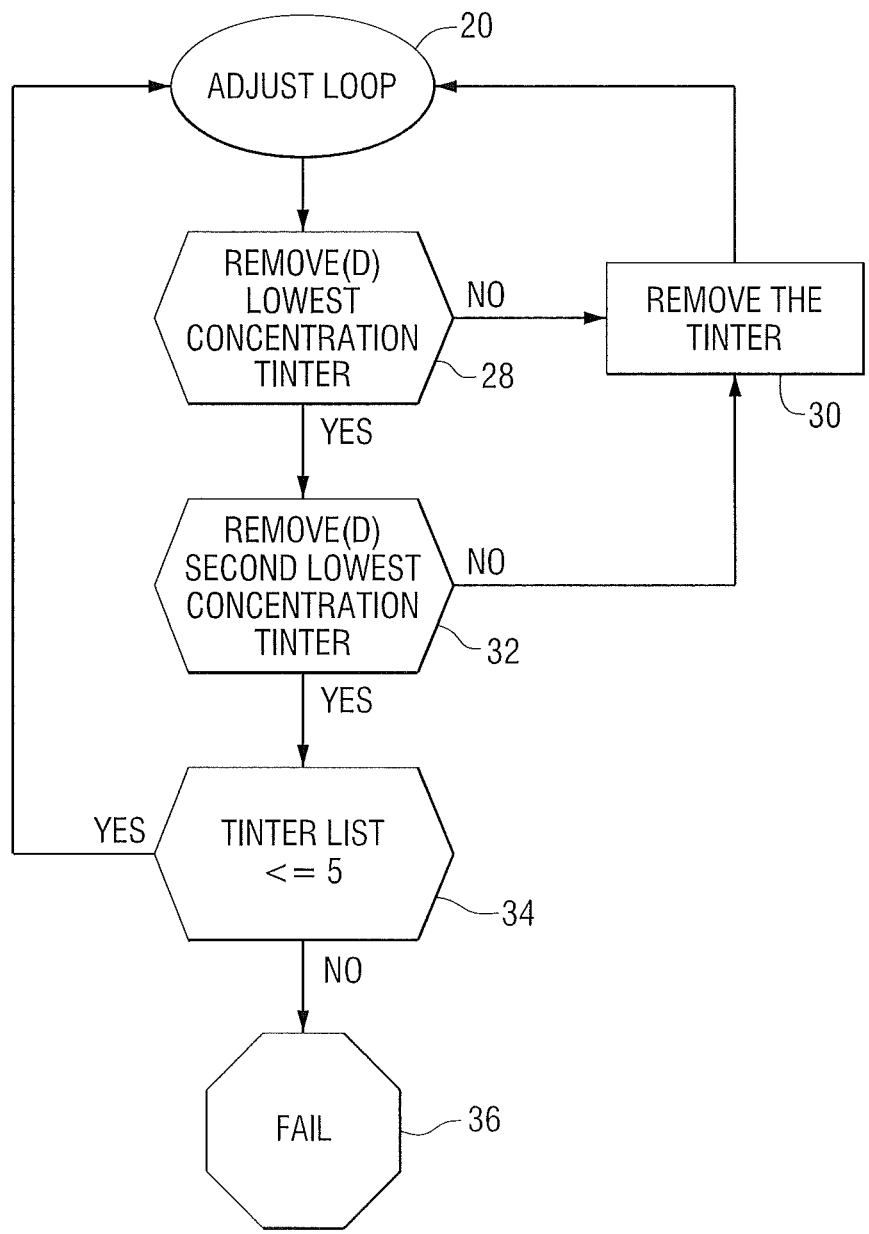
FIG. 2 is a flowchart that provides additional details of the concentration steps illustrated in FIG. 1.
Figure 3:
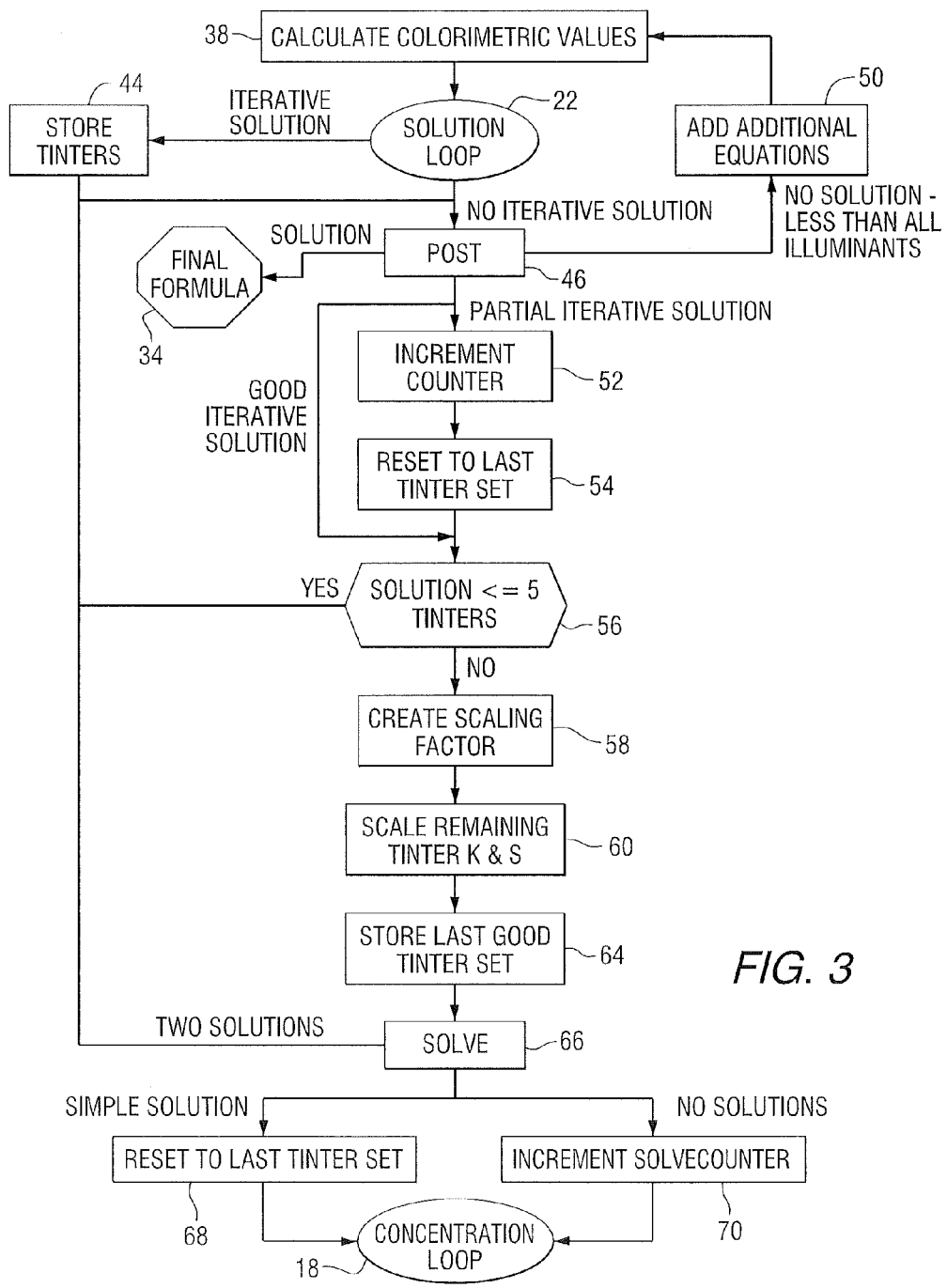
FIG. 3 is a flowchart that provides additional details of the adjust steps illustrated in FIG. 1.

The initial group of toners can be arranged in a list, passed through a solution loop that starts in block 20 of FIG. 2, and then passed to block 22 of FIG. 3. Then the list of toners will arrive at block 74 of FIG. 4. At this stage "passing through" means the entire toner list is skipping the loop and being passed to the next loop.

The first step is to determine if it is possible to formulate the target color using any and/or all of the given toners in the paint system. Starting in block 74 of FIG. 4 a list of equations that is related to the toner formulations needs to be arranged. The equations relate the toners to formulations (more specifically the final formulation criteria as chosen by the user). This list of equations is built after the list of toners has been generated.

In one example, a paint color formulation would be determined by calculating the derivatives or partial derivatives of colorimetric or reflectance values for the target color (such as tristimulus or L, C, h) with respect to K and S or Reflectance for each toner, and performing a mathematical regression (linear, multi-linear, polynomial, etc.). This can be accomplished using an equation relating to each toner in the toner list, wherein the equation is used to calculate a user identified acceptance criteria value based on colorimetric or reflectance values for the target color.

Figure 4:
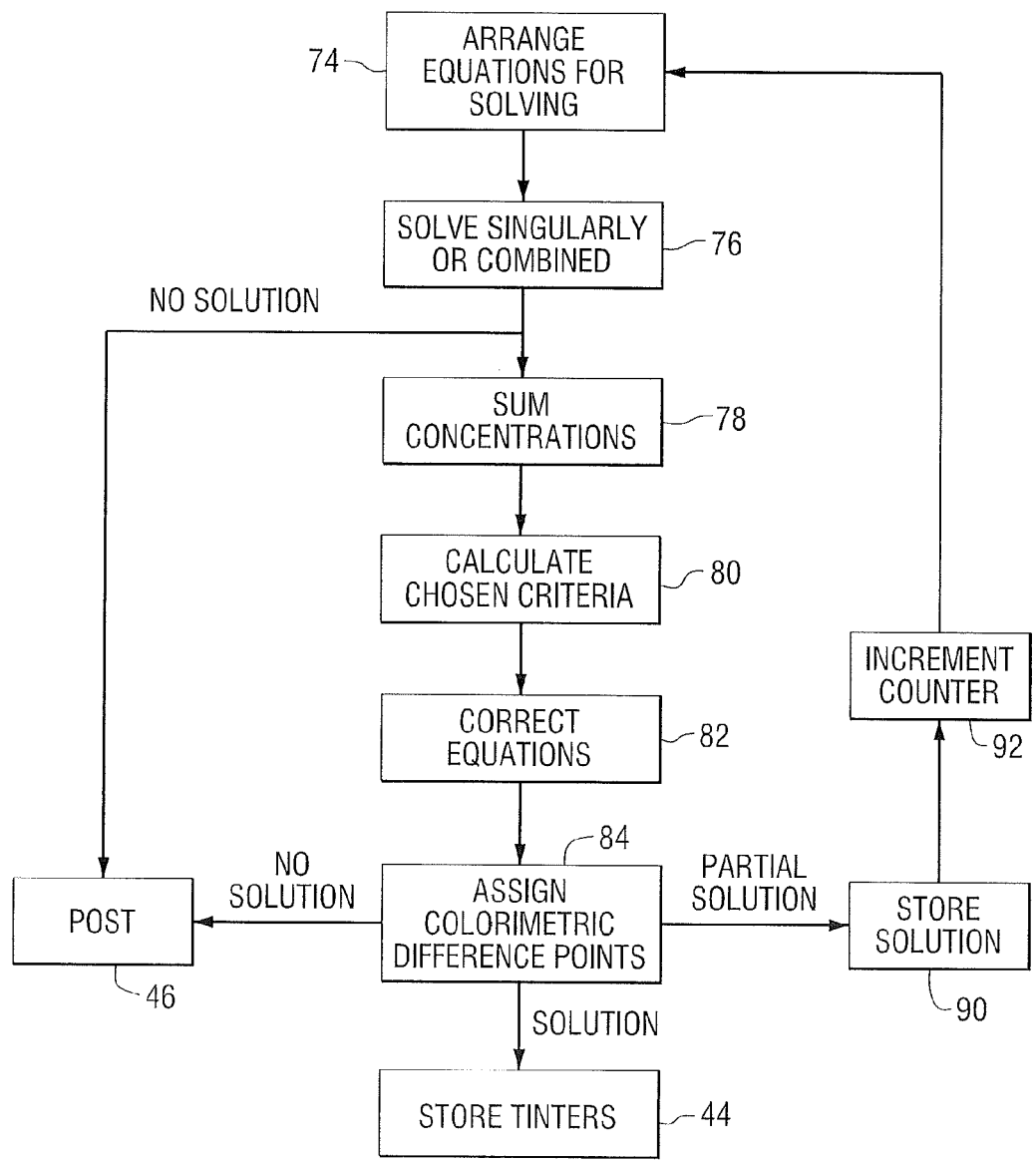
FIG. 4 is a flowchart that provides additional details of the solution steps illustrated in FIG. 1.

Continuing into block 76 of FIG. 4, these equations may be solved individually using basic algebra or collectively using linear algebra (i.e., matrix mathematics). An example of a possible user identified acceptance criteria (i.e., a tristimulus X) is given below.

$$X^P = k \int_\lambda S_\lambda d_\lambda \left(\frac{k}{s}\right)_\lambda \bar{x}_\lambda d\lambda$$

$$d_\lambda = \frac{\delta R_{\lambda,unknown}}{\delta\left(\frac{K}{S}\right)_{\lambda,unknown}}$$

Where:

$R$ = reflectance $X^P$ = pseudo tristimulus X $k = \dfrac{100}{\int_\lambda S_\lambda \bar{y}_\lambda d\lambda}$ $S$ = scattering $K$ = absorbance $\lambda$ = wavelength $\bar{x}_\lambda, \bar{y}_\lambda$ = CIE Standard observer color matching functions The user can do one of two things based on the user chosen equations. The user can define a tolerance and solve an iterative equation that minimizes the difference between the value the user wants and the mathematical value the user gets from a given equation (i.e., "corrections"). Alternatively, the user can force a "direct" solution for the value that the user wants using the selected type of equation (i.e., no tolerance). For the direct solution, the user can put a tolerance on the overall solution for the set of equations through and put "corrections" into place on the overall solution to all of the equations. The example above is the second approach without corrections or tolerances. The "selected type of equation" is singular and refers to one equation out of the set, and "set of equations" (although singular) refers to all of the equations at once. Depending upon the tolerancing option the user has selected, he/she can either compare the solutions of the individual equations or the solution of the entire set of equations to pre-determined tolerances. Typically, tolerances will be a percentage or range of acceptable values or may be as simple as greater than, less than, or equal to a given value. The solution from the equation(s) can be compared to the tolerances defined by the user to determine if the solution is within an acceptable tolerance for the user.

If an attempt to solve the user determined list of equations fails to arrive at a color formulation for the target color, then no solution exists for the initial list of toners and additional toners must be added. In order to select additional toners to add to a paint system one could either randomly select a sampling of additional toners, or visually evaluate the target color and select toners in the area of color space most closely resembling the target. Arriving at a solution for the equations in the prior paragraph is the determining event (FIG. 4). Arriving at a "Does Not Exist" or "NULL" solution ("No Solution") to the equations previously described indicates that there is no formulation for the entire paint system—Block 86.

Failure to find a solution may require additional degrees of freedom, for example, by adding equations perhaps via an illuminant equation (s) as displayed in block 50 of FIG. 3. It is possible to automate the addition of equations from a large list of various colorimetric equations.

Once it has been determined that it is possible to formulate the target color using any and/or all of the given toners in the paint system, the method described herein can be used to simultaneously create a formulation that minimizes metamerism and excludes toners from consideration based upon a maximum number from the number of equations solved (i.e., the number of degrees of freedom available). Minimization of metamerism can be accomplished by including an equation for calculating metamerism within the list of equations or by including equations that consider multiple illuminants. The former requires a direct user selected criteria for metamerism and the latter requires an indirect user selected criteria for metamerism.

After an initial solution is found, the concentrations of toners are added to any prior iterations block 78 of FIG. 4 and the selected differences in user selected criteria (as described further below) between the target color and the solution formulation color are calculated to determine the quality of the match (block 80, FIG. 4). If the specified criteria of the match are not met, a correction needs to be added to the equations per block 82 of FIG. 4. This correction may be some form of weighting function such as $d_k$ or a modification of S or K. This type of correction is much simpler to apply to equations in a matrix versus another form.

In standard connotation: "S" refers to the S of the solution or all S's, "s" refers specifically and only to the s of the toner (K is treated identically). Either way a user can "correct" them to arrive at a different solution if so desired. That is, the user can "correct" any variable of any (or all) equations as long as the correction is consistently applied. This example illustrates correcting k and s to apply to a matrix of equations. Such correction can be accomplished through empirical means since it can be paint system or toner specific. $d_k$ is a textbook correction that can be found in the Berns reference cited above or other sources.

Upon determining that a formulation is found, but not necessarily ideal, (block 90 of FIG. 4) it is possible to continue to place corrections on the matrix and continue iterating until arriving at the final solution (i.e., the formulation no longer substantially changes between iterations). If the formulation meets the user selected criteria, it is considered to be ideal for that user.

It is preferable to temporarily store the immediate formulation prior to re-iterating in the event the formulation is optimum given the list of equations used. A simple comparison to the prior iteration can indicate that the formulation is not improving compared to the user defined criteria and usually indicates that alternative or additional filtering may be necessary by moving to the adjust loop, FIG. 3.

If the final solution meets the user defined criteria (which may be a delta E (DE), metamerism, reflective index, etc.) and a desired number of toners (typically five or less for a solid toner paint system, as many as 11 or more for a metallic/effect paint system), then the problem is solved and the final solution becomes the final formulation. The final formulation will then be made available to the user, for example, on a display or in a printed document. If the user defines a DE and the formulation does not equate to that DE (or less) then it has not met the user defined criteria. Similarly, if the user defined 4 toners and the formulation has 5 toners, but has met the DE criteria, then it has not met all of the user defined criteria.

It is likely that the number of toners in the formulation is excessive at this point so the implementation of a toner filtering method may be required. Once a feasible formulation has been determined for a given paint system the exclusion of toners can proceed starting in block 46 of FIG. 3. Again, if the iterative solution either produced a poor result or was not able to improve adequately using the iterative process in FIG. 4 it is necessary to record the increment as well as switch back to the set of toners from the prior iteration and try (or re-try) the exclusion of toners method. A comparison of the feasible (or previously recorded) solution to the iterative solution is necessary. Whichever solution is closest to meeting all of the user defined criteria is the best. So if the iterative solution is closer then the solution has been improved.

The exclusion of toners can be achieved by comparing the normalized reflectance curve of each toner within the proposed formulation to the normalized reflectance curve of the target color. The absolute value of the differences between the curves becomes the Reflective Scaling Factor ($R_{Sf}$) for each toner (block 58, FIG. 3). The difference between two reflectance curves changes with the wavelength of the illumination. Thus, the following equations may be repeated at many different wavelengths.

The scaling factor is then multiplied by each toner's absorbance (k) and scattering (s) data and placed into a matrix for comparison and elimination (block 60, FIG. 3). Example equations to scale k and s are shown below:

$$k_{ts\lambda} = R_{Sf\lambda} * k_{t\lambda}$$

$$s_{ts\lambda} = R_{Sf\lambda} * s_{t\lambda}$$

where:
  $k_{ts\lambda}$=the scaled absorbance of a toner at a specific wavelength
  $R_{Sf\lambda}$=the Reflective Scaling Factor
  $k_{t\lambda}$=the absorbance of a toner at a specific wavelength
  $s_{ts\lambda}$=the scaled scattering of a toner at a specific wavelength
  $s_{t\lambda}$=the scattering of a toner at a specific wavelength
  $\lambda$=indicates at wavelength.

Then, a scaled k and s matrix may potentially look like the following:

$$\begin{bmatrix} k_{t_0 s \lambda_0} & \cdots & s_{t_n s \lambda_0} \\ \vdots & \ddots & \vdots \\ k_{t_0 s \lambda_n} & \cdots & s_{t_n s \lambda_n} \end{bmatrix}$$

Performing a mathematical regression (block 66, FIG. 3) on the scaled absorbance and scattering data (such as a linear or multiple linear methods) produces the likelihood of a toner being an important part of the solution. This may also be performed by a Principle Component Analysis. A Principle Component Analysis is described in Richard A. Johnson and Dean W. Wichern, "Applied Multivariate Statistical Analysis", Pearson, 2008, which is hereby incorporated by reference. The mathematical regression produces the likelihood of a toner being an important part of the solution via a numerical quantity. This quantity may be, for example, +, −, or 0.

At this point, one would eliminate the negative or zeroed toners (as desired) and recalculate a formulation with the new toner list as outlined above in the formulation section. This procedure continues to be looped until the filter fails to remove any toners, the formulation meets its acceptance criteria, or the filtered toner list fails to produce a formulation.

The system user may define a requirement for the quality of the match which may include delta E values, delta tristimulus, metamerism, or other colorimetric deltas. If a formulation is provided that has been filtered, but does not yet meet the user defined requirement for the quality of the match, additional logical filtering can be performed to manipulate the mathematical processes to focus on absolute minima or maxima instead of a local minima or maxima. To determine if the solution meets the quality criteria, the found solution can be compared to the user defined criteria. If it matches the quality criteria within a chosen tolerance (or no tolerance depending on the user and equations) then it is acceptable.

Often there is more than one mathematical solution (and thus physical formulation) to match a color which are represented by minimas and maximas of the solutions. Therefore, if the solution arrived at does not satisfactorily meet the user defined criteria, it is necessary to further manipulate the mathematical process prior to providing a formulation to the user. The best possible solution is expected to be the absolute minima or absolute maxima.

Considering the formulation provided by the mathematical loops, a primary logical operation would consist of removing the lowest concentration toner (block 28, FIG. 2) and placing the toner list, with the lower concentration toner removed, back through the adjust and solution loops.

The steps in FIG. 2 initially remove the lowest concentration toner the first time through the loop and then restores it and removes the second lowest concentration toner if there is a second pass.

Failing the removal of the lowest concentration toner, a secondary logical operation can be implemented to re-instate the lowest concentration toner and remove the second lowest concentration toner from the formulation toner list (block 32, FIG. 2). At that point, the new toner list would be run through the mathematical loops as described above.

Returning to the steps described in FIG. 4, the process would not be considered to have failed until all possible additions to the degrees of freedom had been considered. "Degrees of Freedom" refers to the total number of equations +1. That is, the number of degrees of freedom is simply the amount of variables that are considered in order to arrive at a formulation.

If a process exits the steps of FIG. 2 as a failure, one should again consider adding additional derivative equations to the matrix, additional toners to the paint system, or including further information such as additional derivatives considering additional illuminants (typically D65, A, F32) and restarting the process from the beginning. One can think of the equations as user defined criteria. User defined criteria (i.e., the equations) relate to the quality of the match. The equations may directly utilize toner information/characteristics (such as in the case of X defined above), but may also be indirectly related such as in the case of DE (still at some point to get the DE the toner information was used). One skilled in the art will have a list of equations and know how to use them and/or incorporate them from a text book.

The complete process can be automated to avoid human errors so additional potential equations should be selected ahead of time to be included as needed. The process can start with a comprehensive list of equations and initially only use selected equations from the list. Then additional equations can be "turned on" if a solution is not found, or more precision is desired.

Once all potential degrees of freedom have been considered, if a viable formulation is possible, the described process will select the single best formula given the selected criteria (e.g., metamerism, usage of less than 4 toners, low Delta E, etc.). The value from the final formulation is compared to the user defined criteria.

The process described above uses a three tiered approach to determining the final paint formula. An initial set of toners is selected and three processing loops are used to cull out toners until an acceptable formulation is determined. In each iteration, the least likely toners are removed. As used herein, the least likely toners are those that are least likely to be able to be used to match the target color in a formulation meeting the user selected criteria.

The method described above can be applied for producing color matched coating compositions suitable for use in the automotive refinish applications. It can also be used for other applications, such as for example in matching industrial or consumer paints.

In addition to eliminating the unnecessary mixture of complementary colors (i.e., colors that absorb each other's reflected light), this process also selects the most appropriate toners from a list so that the user does not need to have any interaction with the color matching tool other than to supply the reflectance curve of the target color. The process can be used as a filter to reduce the number of toners used to produce an acceptable match, and it can be further restricted to utilize substitute toners that produce a good match, but are more cost effective.

The mathematics and the tiered structure of the method results in the removal of complementary color toners from the final formulation because complementary color toners end up being the least likely toners due to other preferential toners being available in the paint system.

The described process solves for a match using a three step process. In general, it would be desirable to find a matching formula using less than 4 toners (but a larger number may be acceptable). The process may result in: the elimination of color matching using complementary colors; increased speed of the color matching software; tighter control of the color matching software to reduce expensive pigmentations; simplified color matching software; and a reduction in the number of toners utilized to produce an acceptable match to a desired color.

The process described above can use K and S data to get an optimum single solution. In a chosen paint system, the resin can be treated as a toner. A base toner, typically white, and at least one other toner may be considered in the selected paint system.

Figure 5:
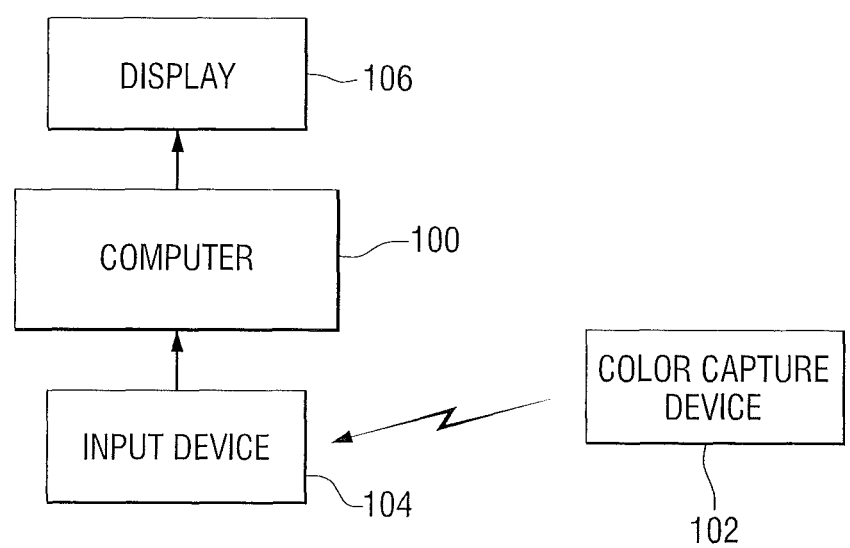
FIG. 5 is a block diagram of a computer system that can be used to implement the process described in FIGS. 1-4.

FIG. 5 is a block diagram of a computer system that can be used to implement the process described in FIGS. 1-4. The system in this example includes a computer 100 or other processor that is programmed to perform the calculations described above. Target color characteristics can be captured using a color capture device 102, such as a spectrophotometer, and input to the computer via an input device 104. An output device, such as a display 106 or printer can be included to convey the results (i.e., the formulation) of the selection process to a user.

In one embodiment, a list of toners can be displayed with their solution amounts including a metameric index and predicted ΔE at each illuminant (or optionally at their primary illuminant if a preferred primary illuminant has been defined) along with an RGB image of the target color and the formulation color. The display may also include any criteria that may have been defined such as for example ΔE, L, a, b, C, h, X, Y, Z, opacity, metamerism, etc., along with a RGB color swatch for the target and formulation.

The preceding description describes a method for determining a paint formulation that includes: obtaining target color information for a target color, identifying a plurality of toners and corresponding concentrations of the toners in a paint formula that can be used to produce a paint having a color that is similar to the target color, and modifying the paint formula by removing one of the identified toners having a lowest concentration to produce a modified paint formula that can be used to produce a paint having a color that is similar to the target color, and determining if the modified paint formula meets user specified acceptance criteria. The user specified acceptance criteria can include at least one of: ΔE, L, a, b, C, h, X, Y, Z, opacity, and metamerism.

In one example, the removed toner can be reinserted and one of the identified toners having a second lowest concentration can be removed to produce the modified paint formula. The target color information can include at least one of: reflectance, textural data, or colorimetric information. The target color information can be obtained using a spectrophotometer or a spectrophotometer/camera combination.

K and S values for each of a plurality of toners in the paint system and reflectance data for the target color can be used in a toner identification process including a concentration loop, an adjust loop, and a solution loop. The method can produce a paint formulation that does not include complementary color toners.

To identify a plurality of toners, a plurality of equations can be solved to determine a quality of a match between the paint color and the target color. The method can further include displaying the toners and concentrations of the toners in the second paint formula with an RGB color swatch for the target color and the paint color of the modified formulation.

In another aspect, an apparatus includes a device for capturing information for a target color, a processor for identifying a plurality of toners and corresponding concentrations of the toners in a paint formula that can be used to produce a paint having a color that is similar to the target color within user specified acceptance criteria, and removing one of the identified toners having a lowest concentration to produce a modified paint formula that can be used to produce a paint having a color that is similar to the target color within the user specified acceptance criteria, and an output device for conveying the modified paint formulation to a user.

In another example, the processor reinserts the removed toner and removes one of the identified toners having a second lowest concentration to produce the modified paint formula. The processor can be programmed to perform the method described above.

In another aspect, the invention can be implemented using a non-transitory computer readable medium containing instructions for controlling a computer or other processing system to perform any or all of the processes described above.

The method and apparatus described above outputs the single best formulation (i.e. only 1 formulation) aligned to all of the user defined criteria. Thus a color matcher no longer has to wade through hundreds or thousands of sorted formulations to pick the one he/she likes best.

While the invention has been described in terms of several embodiments, it will be apparent to those skilled in the art that various changes can be made to the described embodiments without departing from the scope of the invention.

What is claimed is:

1. A method comprising:
   obtaining target color information for a target color;

identifying a plurality of toners and corresponding concentrations of the toners in a paint system, that includes complementary color toners, for a formula for producing a paint having a color that is similar to the target color within user specified acceptance criteria;

modifying the paint formula by removing one of the identified toners having a lowest concentration to produce a modified paint formula for producing a paint having a color that is similar to the target color, wherein the identified toners do not include complementary color toners; and determining if the modified paint formula meets user specified acceptance criteria.

2. The method of claim 1, wherein if the modified paint formula does not meet the user specified acceptance criteria the modifying step is repeated.

3. A method comprising:

obtaining target color information for a target color;

identifying a plurality of toners and corresponding concentrations of the toners in a paint formula for producing a paint having a color that is similar to the target color within user specified acceptance criteria;

modifying the paint formula by removing one of the identified toners having a lowest concentration to produce a modified paint formula for producing a paint having a color that is similar to the target color;

determining if the modified paint formula meets user specified acceptance criteria;

reinserting the removed toner;

removing one of the identified toners having a second lowest concentration to produce the modified paint formula; and repeating the determining step.

4. The method of claim 1, wherein the target color information comprises at least one of:

reflectance, textural data, or colorimetric information.

5. The method of claim 1, wherein the target color information is obtained using a spectrophotometer or a spectrophotometer/camera combination.

6. The method of claim 1, wherein absorbance and scattering values for each of the plurality of toners in the paint system and reflectance data for the target color are used in a toner identification process including a concentration loop, an adjust loop, and a solution loop.

7. The method of claim 1, wherein the step of identifying a plurality of toners comprises:

solving a plurality of equations that use the toners to formulate and determine a quality of a match between the paint color and the target color.

8. The method of claim 1, wherein the user specified acceptance criteria comprises at least one of:

reflectance, textural data, colorimetric information, opacity, and metamerism.

9. The method of claim 1, further comprising:

displaying the toners and concentrations of the toners in the modified paint formula with an RGB color swatch for the target color and the paint color of the modified formulation.

10. An apparatus comprising:

a device for capturing information for a target color;

a processor for identifying a plurality of toners and corresponding concentrations of the toners in a paint system, that includes complementary color toners, for a formula for producing a paint having a color that is similar to the target color, removing one of the identified toners having a lowest concentration to produce a modified paint formula for producing a paint having a color that is similar to the target color, wherein the identified toners do not include complementary color toners, and determining if the modified paint formula meets user specified acceptance criteria; and an output device for conveying the modified paint formulation to a user.

11. The apparatus of claim 10, wherein if the modified paint formula does not meet the user specified acceptance criteria the processor repeats the removing step.

12. An apparatus comprising:

a device for capturing information for a target color;

a processor for identifying a plurality of toners and corresponding concentrations of the toners in a paint formula for producing a paint having a color that is similar to the target color, removing one of the identified toners having a lowest concentration to produce a modified paint formula for producing a paint having a color that is similar to the target color, wherein the identified toners do not include complementary color toners, and determining if the modified paint formula meets user specified acceptance criteria, wherein the processor reinserts the removed toner and removes one of the identified toners having a second lowest concentration to produce the modified paint formula; and an output device for conveying the modified paint formulation to a user.

13. The apparatus of claim 10, wherein the target color information comprises at least one of:

reflectance, textural data, or colorimetric information.

14. The apparatus of claim 10, wherein the target color information is obtained using a spectrophotometer or a spectrophotometer/camera combination.

15. The apparatus of claim 10, wherein absorbance and scattering values for each of the plurality of toners in the paint system and reflectance data for the target color are used in a toner selection process including a concentration loop, an adjust loop, and a solution loop.

16. The apparatus of claim 10, wherein the processor solves a plurality of equations that use the toners to formulate and determine a quality of a match between the paint color and the target color.

17. The apparatus of claim 10, wherein the user specified acceptance criteria comprises at least one of:

reflectance, textural data, colorimetric information, opacity, and metamerism.

18. The apparatus of claim 10, wherein the output device displays the toners and concentrations of the toners in the modified paint formula with a RGB color swatch for the target color and the paint color of the modified formula.

* * * * *